W. W. W. KEYES.
CONTINUOUS DRAWING APPARATUS FOR MAKING WINDOW GLASS.
APPLICATION FILED MAY 21, 1912.
1,058,065.
Patented Apr. 8, 1913.
2 SHEETS—SHEET 2.
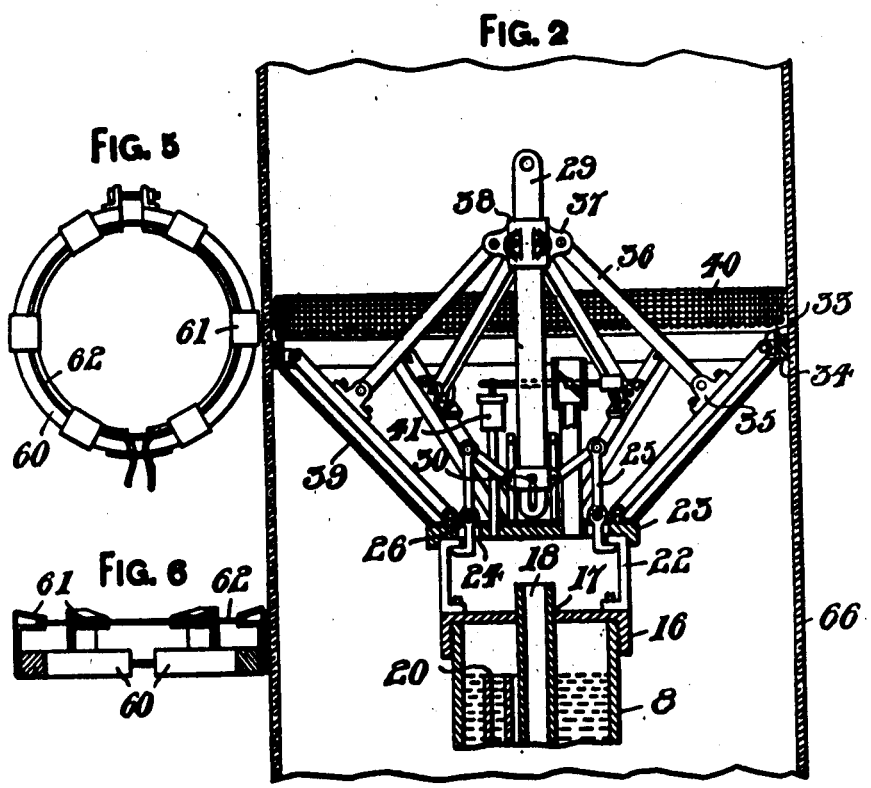
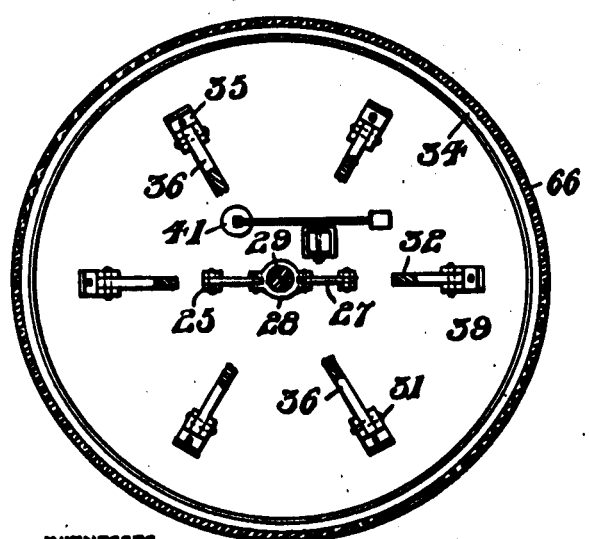
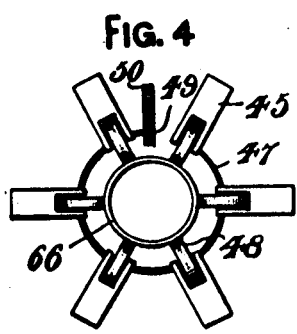
WITNESSES
INVENTOR
William W. W. Keyes.
BY
ATTORNEYS

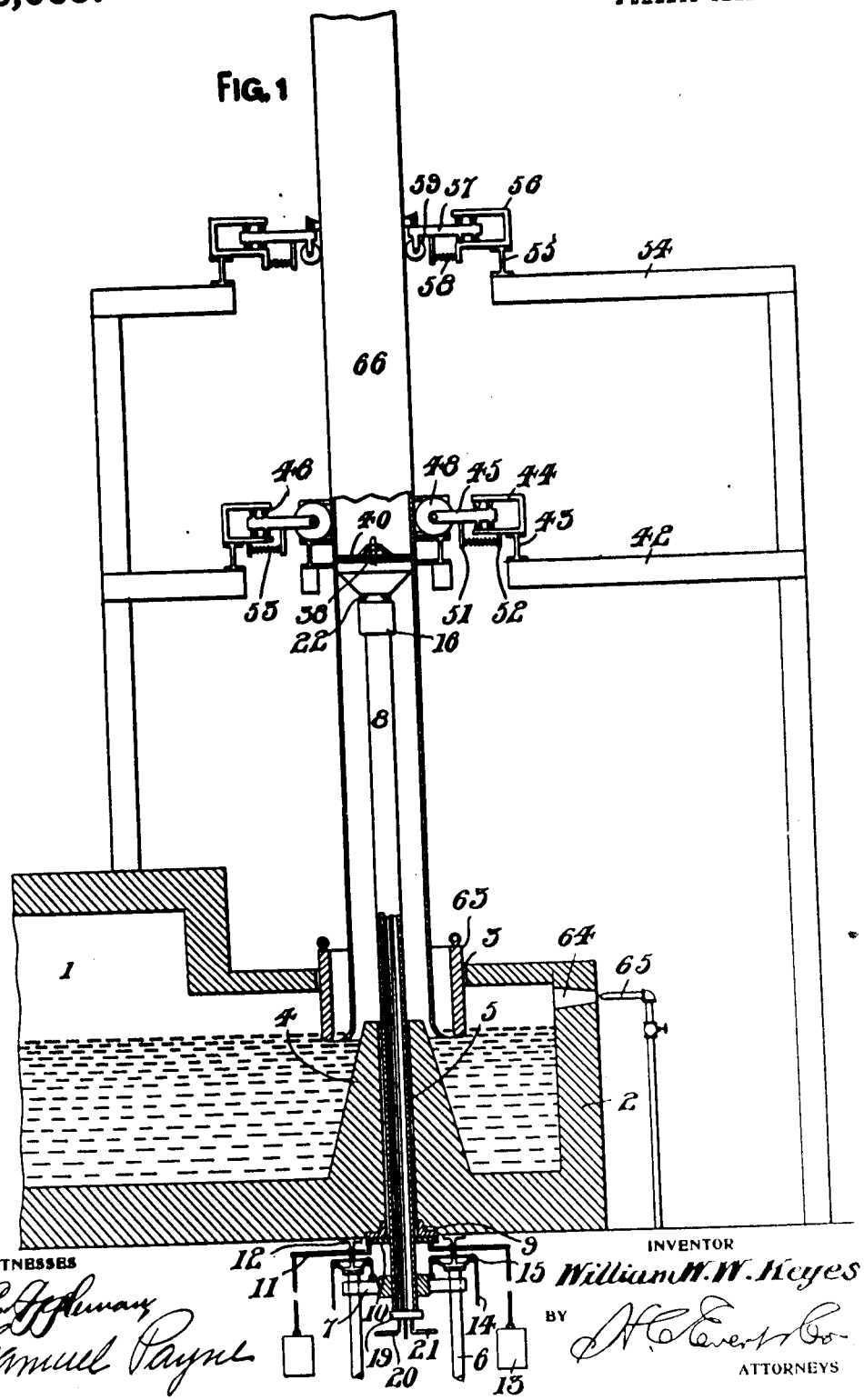

UNITED STATES PATENT OFFICE.

WILLIAM W. W. KEYES, OF ALEXANDRIA, INDIANA.

CONTINUOUS DRAWING APPARATUS FOR MAKING WINDOW-GLASS.

1,058,065. Specification of Letters Patent. Patented Apr. 8, 1913.

Application filed May 21, 1912. Serial No. 698,839.

*To all whom it may concern:*

Be it known that I, WILLIAM W. W. KEYES, a citizen of the United States of America, residing at Alexandria, in the county of Madison and State of Indiana, have invented certain new and useful Improvements in Continuous Drawing Apparatus for Making Window-Glass, of which the following is a specification, reference being had therein to the accompanying drawing.

This invention relates to a continuous glass drawing apparatus for making window glass, and the primary object of my invention is to provide an apparatus of the above type by which glass can be continuously drawn from a tank to form a hollow cylinder that can be cut into desired lengths as the cylinder is formed.

Another object of this invention is to provide a glass drawing apparatus embodying a novel expansible guide head that serves as a plug for the greater part of the drawn cylinder, whereby a pressure of air can be maintained in the cylinder to prevent collapse of the same.

A further object of this invention is to accomplish the above results by a mechanical construction that is durable, easy to install, and operate, and highly efficient for the purposes for which it is intended.

With the above and other objects in view, the invention resides in a novel construction, combination and arrangement of parts to be hereinafter specifically described and then claimed.

The principles of my invention are illustrated in the drawings wherein:—

Figure 1 is a side elevation of the apparatus partly broken away and partly in section. Fig. 2 is an enlarged vertical sectional view of a combined guide and plug. Fig. 3 is a horizontal sectional view of the same. Fig. 4 is a plan of the drawing mechanism. Fig. 5 is a plan of a cutting or fracturing ring, and Fig. 6 is a cross sectional view of the same.

Further describing my invention in detail with reference to the drawing, wherein like numerals denote corresponding parts throughout: 1 denotes a glass melting tank having an extension 2, the top of which is provided with an opening 3. The bottom of the tank extension 2 has a conical shaped guide 4 directly beneath the opening 3 and said guide has a vertical opening 5 extending from the top of the guide 4 to the bottom of the extension 2.

Arranged below the extension 2 of the tank 1 are vertical parallel standards or guides 6 and slidably mounted upon said guides is a cross head 7. Mounted in said cross head is the lower end of a stand pipe 8 that extends upwardly to the opening 5 of the guide 4 and through the opening 3. The lower end of the opening 5 has an annular seat 9 for a packing ring or closure 10, which surrounds the stand pipe 8 and closes the lower end of the opening 5. The closure 10 is retained upon the seat 9 by levers 11 fulcrumed in I-beams 12, carried by the upper ends of the guides 6 and assisting in supporting the bottom of the melting tank 1. The outer ends of the levers 11 are provided with weights 13 and by raising the weights 13 the closure 10 can be released and removed.

The stand pipe 8 is supported in a raised or elevated position by cables 14 that pass over revoluble sheaves 15, carried by the I-beams 12. The cables 14 are attached to the cross head 7 and by manipulating said cables the pipe 8 can be raised and lowered.

The upper end of the stand pipe 8 is provided with a cap 16 having a circle opening 17 through which extends the upper end of a pipe 18 that is arranged longitudinally of the stand pipe 8. The lower end of the pipe 18 extends through a cap 19 mounted upon the lower end of the stand pipe 8, and the pipe 18 is in communication with a suitable supply of air under pressure.

Extending through the cap 19 is a water supply pipe 20 which extends in proximity to the cap 16 for supplying water to the interior of the stand pipe 8. Connected to the cap 19 is a water outlet pipe 21 and it is through the medium of the pipes 20 and 21 that water can be circulated in the stand pipe 8 for cooling the same and preventing the pipes from becoming distorted by the intense heat of the glass as it is drawn from the melting tank 1.

Mounted upon the cap 16 are diametrically opposed brackets 22 and detachably connected to said brackets is a bottom plate 23. The bottom plate 23 has openings 24 and extending through said openings are locking members 25 that are pivotally supported by apertured lug 26, carried by the bottom plate 23. The locking members 25 have the upper ends thereof pivotally connected to links 27 and said links are pivotally connected to a sleeve 28 that is slidably mounted upon the lower end of a rod 29, said sleeve being retained in engagement with the rod 29 by a transverse pin 30 extending through a slot provided therefor in the lower end of the rod 29. By elevating the rod 29, the locking members 25 are shifted to release the brackets 22, whereby the bottom plate 23 can be moved independently of said brackets.

The bottom plate 23 is provided with circumferentially arranged sets of apertured lugs 31 and pivotally connected to said lugs are angularly disposed arms 32. These arms have the upper ends thereof pivotally connected to apertured lugs 33, carried by the inner sides of a yieldable band 34, preferably made of rubber. The arms 32, adjacent to the upper end thereof are provided with bearings 35 and pivotally connected to said bearings are angularly disposed links 36 that are connected to apertured lugs 37, carried by a sleeve 38 mounted upon the rod 29, adjacent to the upper end thereof.

Connected to the inner side of the yieldable band 34 is a shield 39, made of asbestos or other fire-proof material. The shield 39 has the lower edges thereof secured to the bottom plate 23, and said shield snugly fits around the locking members 25 and the apertured lugs 33, said shield coöperating with the band 34 in forming a plug. Arranged upon the upper edges of the shield 39 is a horizontal screen 40, preferably made of interwoven wire, said screen having openings providing clearance for the links 36. The screen 40 prevents matter that might accidentally fall thereon from interfering with the operation of the combined guide and plug.

The bottom plate 23 is provided with a safety pressure device that is in communication with the underside of the bottom plate. This safety device is generally designated 41 and is similar to the safety pressure device disclosed in my companion application filed under even date. The device is adapted to relieve an excessive pressure beneath the bottom plate 23 and the shield 39.

Arranged upon the melting tank 1 is a frame work having converging supports 42 and mounted upon said supports are I-beams 43. The I-beams 43 are provided with housings 44 and slidably mounted in said housings are bearings 45, said bearings having anti-frictional rollers 46 that movably support the bearings 45 in said housing. The bearings 45 support a revoluble flexible shaft 47 and mounted upon said shaft are drawing wheels or rollers 48. One end of the flexible shaft 47 has a small gear wheel 49 and meshing with said wheel is another gear wheel 50. The gear wheel 50 is driven from a suitable source of energy, for instance, an electric motor located upon one of the supports 42.

The bearings 45 are provided with depending pins 51 and the housings 44 are provided with depending pins 52. These pins are connected by coiled compression spring 53, the object of which will presently appear.

Arranged above the supports 42 are additional supports 54, each of which has an I-beam 55, a housing 56, a bearing 57 and a compression spring 58, the elements 54 to 58 inclusive being similar to the elements 42 to 45 inclusive and the element 53. The bearings 57 are provided with revoluble guide wheels or rollers 59, and arranged upon said bearings is a cutting or fracturing device, best shown in Figs. 5 and 6. The cutting device comprises a sectional ring 60 having the sections thereof suitably connected together. The ring 60 is provided with a plurality of vertical resilient holders 61 for a cutting or fracturing wire 62. This wire can be charged with electricity or heated for cracking and fracturing a piece of glass against which the wire is placed.

Located in the opening 3 of the tank extension 2 is a ring 63 that controls the temperatures of the molten glass within the melting tank 1, said ring being fully disclosed in the prior Patent #846,316, granted March 5, 1907. The extension 2 of the tank also has an opening 64 whereby a flame of a burner 65 can be projected into the tank extension 2 to maintain the molten glass therein in condition for drawing purposes.

In operation, it is necessary that the drawing head disclosed in my companion application filed under even date be resorted to, to start the cylinder whereby it can be continuously drawn. I will assume that the cylinder, designated 66, has been drawn to a point above the drawing wheels 48 and that said wheels are engaging the cylinder and moving the same upwardly between the guide rollers 59. As soon as the cylinder 66 has been formed to that extent the combined guide head and plug is lowered into the cylinder from the upper end thereof and locked in engagement with the brackets 22. A cable can be resorted to for lowering the guide and plug into the cylinder and immediately upon the rod 29 being released, the weight of the rod and its appurtenant parts is sufficient to expand the guide head, whereby the band 34 will engage the inner walls of the cylinder 66. Air can then be admitted through the pipe 18 and with the air of the pressure in the lower part of the cylinder 66, said cylinder can be continuously drawn. An excess pressure of air within the cylinder 66 is relieved through the safety pressure device 41. The guide head and plug remains stationary while the cylinder is being drawn and with the drawing wheels 14 engaging the outer sides of the cylinder, the cylinder is gradually carried upwardly between the guide wheels or rollers 59 that are held in engagement with the cylinder through the medium of the compression spring 58. The springs 58 also retain the drawing wheels or rollers 48 in engagement with the cylinder whereby said cylinder can be elevated by the frictional contact of the wheels or rollers. After the cylinder 66 has been drawn a sufficient height above the guide rollers 59, the wire 62 can be employed for cutting the cylinder and for fitting of the length thereof being removed.

From the foregoing it will be observed that I have devised an apparatus by which glass in a cylindrical form can be continuously drawn from a tank. Besides making provision for guiding and drawing a cylinder provision is made for maintaining an air pressure within the drawn portion of said cylinder, also for cooling the stand-pipe which supports the detachable guide and plug head.

While in the drawings there is illustrated a preferred embodiment of my invention, it is to be understood that the structural elements are susceptible to such changes in the size, proportion and manner of assemblage as fall within the scope of the appended claims.

What I claim is:—

1. In a glass drawing apparatus, a melting tank, a stand pipe extending upwardly through said tank and in communication with a water supply, an air supply pipe extending upwardly through said stand pipe, a combined expansible guide and plug head detachably connected to the upper end of said stand pipe, circumferentially arranged yieldable drawing rollers arranged above said tank and in proximity to said head, and guide rollers arranged above drawing rollers.

2. In a glass drawing apparatus, a melting tank, a stand pipe extending upwardly through said tank and in communication with a water supply, an air supply pipe extending upwardly through said stand pipe, a combined expansible guide and plug head detachably connected to the upper end of said stand pipe, circumferentially arranged yieldable drawing rollers arranged above said tank and in proximity to said head, guide rollers arranged above said drawing rollers, and a cutting device supported above guide rollers.

3. In a continuous glass drawing apparatus, a glass tank, a stand pipe extending upwardly through said tank, an air supply pipe extending upwardly through said stand pipe, a combined expansible guide and plug head detachably connected to the upper end of said stand pipe, revoluble drawing rollers yieldably supported in proximity to said head, and guide rollers arranged above said drawing rollers.

4. In a continuous glass drawing apparatus, a melting tank, a stand pipe extending through said tank, a combined expansible guide and plug head detachably connected to the upper end of said stand pipe, revoluble drawing rollers yieldably supported in proximity to said head, guide rollers arranged above said drawing rollers, and a cutting device arranged above said guide rollers.

5. In a continuous glass drawing apparatus, a melting tank, a stand pipe extending upwardly from said tank and in communication with a supply of water, an air supply pipe extending upwardly through said stand pipe, a combined expansible guide and plug head detachably connected to the upper end of said stand pipe, revoluble drawing rollers yieldably supported adjacent to said head, revoluble guide rollers yieldably supported above said drawing rollers, and a cutting device including a wire arranged above said side rollers.

6. In a continuous glass drawing apparatus, a melting tank, a stand pipe extending through said tank and capable of being lowered from said tank, pipes in communication with the lower end of said stand pipe and adapted to maintain a circulation of water therein, an air supply pipe extending upwardly through said stand pipe, an expansible plug carried by the upper end of said stand pipe and adapted to seal a cylinder surrounding said stand pipe, revoluble drawing rollers yieldably supported adjacent to said plug, and guide rollers yieldably supported above said drawing rollers.

In testimony whereof I affix my signature in the presence of two witnesses.

WILLIAM W. W. KEYES.

Witnesses:
Max H. Srolovitz,
K. H. Butler.

---

Copies of this patent may be obtained for five cents each, by addressing the "Commissioner of Patents, Washington, D. C."